(12) United States Patent
Chen et al.

(10) Patent No.: US 12,379,158 B2
(45) Date of Patent: Aug. 5, 2025

(54) ELECTRODE PLATE DRYING DEVICE AND COATING DEVICE

(71) Applicant: CONTEMPORARY AMPEREX TECHNOLOGY (HONG KONG) LIMITED, Hong Kong (CN)

(72) Inventors: Wei Chen, Ningde (CN); Huan Che, Ningde (CN); Shisong Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/342,753

(22) Filed: Jun. 28, 2023

(65) Prior Publication Data
US 2023/0341184 A1   Oct. 26, 2023

Related U.S. Application Data

(63) Continuation of application No. PCT/CN2022/127340, filed on Oct. 25, 2022.

(30) Foreign Application Priority Data

Oct. 29, 2021   (CN) .......................... 202122636244.7

(51) Int. Cl.
*F26B 13/08*    (2006.01)
*F26B 13/00*    (2006.01)
(Continued)

(52) U.S. Cl.
CPC ............ *F26B 13/08* (2013.01); *F26B 13/002* (2013.01); *F26B 13/12* (2013.01); *F26B 13/18* (2013.01); *F26B 25/22* (2013.01); *F26B 25/225* (2013.01)

(58) Field of Classification Search
CPC ........ F26B 13/08; F26B 13/002; F26B 13/12; F26B 13/18; F26B 25/22; F26B 25/225;
(Continued)

(56) References Cited

U.S. PATENT DOCUMENTS 2,457,282 A * 12/1948 Simmons ................ F26B 13/18
219/520
4,176,464 A * 12/1979 Randolph ............. F26B 25/225
34/191
(Continued)

FOREIGN PATENT DOCUMENTS

CN   202539030 U      11/2012
CN   202925322 U  *   5/2013
(Continued)

OTHER PUBLICATIONS

Translation, JP-2020087747-A, Jun. 2020 (Year: 2020).*
(Continued)

*Primary Examiner* — Jessica Yuen
(74) *Attorney, Agent, or Firm* — K&L Gates LLP (57) ABSTRACT

Provided are an electrode plate drying device and a coating device, and relates to the technical field of batteries. The electrode plate drying device includes an oven, a first deflector roll, and a second deflector roll. The oven is configured to dry an electrode plate. The first deflector roll and the second deflector roll are disposed in the oven. The electrode plate winds around the first deflector roll and the second deflector roll. Positions of the first deflector roll and/or the second deflector roll in the oven are tunable so as to adjust a movement distance of the electrode plate in the oven.

20 Claims, 2 Drawing Sheets

(51) Int. Cl.
*F26B 13/12* (2006.01)
*F26B 13/18* (2006.01)
*F26B 25/22* (2006.01)

(58) Field of Classification Search
CPC ............ F26B 3/04; F26B 3/30; F26B 13/103;
H01M 4/0404; H01M 4/139; H01M
4/0471; B05C 9/14; Y02E 60/10
See application file for complete search history.

(56) References Cited

U.S. PATENT DOCUMENTS

| | | | |
|---|---|---|---|
| 4,539,275 A | | 9/1985 | Plasse |
| 4,704,805 A | * | 11/1987 | Kaya ...................... F26B 21/06 |
| | | | 34/483 |
| 4,887,365 A | | 12/1989 | Oda |
| 2016/0273832 A1 | | 9/2016 | Asada et al. |
| 2018/0022114 A1 | | 1/2018 | Sakamoto et al. |
| 2021/0207322 A1 | * | 7/2021 | Biegelsen ............... F26B 25/22 |

FOREIGN PATENT DOCUMENTS

| | | | | | |
|---|---|---|---|---|---|
| CN | 203648813 U | | 6/2014 | | |
| CN | 104148263 A | * | 11/2014 | | |
| CN | 204602548 U | | 9/2015 | | |
| CN | 110828773 A | | 2/2020 | | |
| CN | 210892560 U | | 6/2020 | | |
| CN | 211026959 U | | 7/2020 | | |
| CN | 212741829 U | * | 3/2021 | | |
| CN | 216500419 U | | 5/2022 | | |
| JP | S6148580 A | * | 3/1986 | | |
| JP | H0624673 B2 | | 4/1994 | | |
| JP | 2000084465 A | | 3/2000 | | |
| JP | 2005069576 A | | 3/2005 | | |
| JP | 2009235357 A | * | 10/2009 | | |
| JP | 2014105084 A | | 6/2014 | | |
| JP | 2016061473 A | | 4/2016 | | |
| JP | 6542071 B2 | | 7/2019 | | |
| JP | 2020087747 A | * | 6/2020 | | |
| JP | 2020136546 A | * | 8/2020 | ............ | C09J 135/02 |
| KR | 20140134180 A | | 11/2014 | | |
| KR | 20170100132 A | | 9/2017 | | |
| WO | WO-2014078887 A1 | * | 5/2014 | ................ | F26B 3/30 |

OTHER PUBLICATIONS

Translation, CN-212741829-U, Mar. 2021 (Year: 2021).*
Translation, CN-202925322-U, May 2013 (Year: 2013).*
Translation, JP-S6148580-A, Mar. 1986 (Year: 1986).*
Translation, CN-104148263-A, Nov. 2014 (Year: 2014).*
Translation, JP-2009235357-A (Year: 2009).*
Translation, JP-2020136546-A (Year: 2020).*
International search report received in the corresponding international application PCT/2022/127340, mailed Jan. 20, 2023.
Written opinion received in the corresponding international application PCT/2022/127340, mailed Jan. 20, 2023.
The extended European search report received in the corresponding European application 22885935.1, mailed May 22, 2024.

* cited by examiner

ELECTRODE PLATE DRYING DEVICE AND COATING DEVICE

CROSS-REFERENCE TO RELATED APPLICATIONS

This application is a continuation of International Application PCT/CN2022/127340, filed Oct. 25, 2022, which claims priority to Chinese Patent Application No. 202122636244.7, filed on Oct. 29, 2021 and entitled "ELECTRODE PLATE DRYING DEVICE AND COATING DEVICE", which is incorporated herein by reference in its entirety.

TECHNICAL FIELD

This application relates to the technical field of batteries, and in particular, to an electrode plate drying device and a coating device.

BACKGROUND

Energy conservation and emission reduction are key to sustainable development of the automobile industry. Electric vehicles have become an important part of the sustainable development of the automobile industry by virtue of energy saving and environmental friendliness. Battery technology is crucial to development of electric vehicles.

Currently, a power battery generally includes a housing and an electrode assembly. The housing is configured to accommodate the electrode assembly and an electrolytic solution. The electrode assembly generally includes a positive electrode plate and a negative electrode plate. Metal ions move between the positive electrode plate and the negative electrode plate to generate electrical energy. During production of the power battery, an important process is to coat a substrate with a slurry to prepare an electrode plate, and then put the electrode plate into a drying device for drying. Therefore, how to adjust the dryness of the electrode plate to meet the requirements of the electrode plate for different drying states is an urgent problem to be solved.

SUMMARY

Some embodiments of this application provide an electrode plate drying device and a coating device to adjust a movement distance of an electrode plate in the electrode plate drying device and meet the requirements of the electrode plate for different drying states.

According to a first aspect, an embodiment of this application provides an electrode plate drying device, including: an oven, configured to dry an electrode plate; a first deflector roll, disposed in the oven; and a second deflector roll, disposed in the oven. The electrode plate winds around the first deflector roll and the second deflector roll. Positions of the first deflector roll and/or the second deflector roll in the oven are tunable so as to adjust a movement distance of the electrode plate in the oven.

In the foregoing solution, the electrode plate winds around the first deflector roll and the second deflector roll. The positions of the first deflector roll and/or the second deflector roll in the oven are tunable so that the movement distance of the electrode plate in the oven is tunable. Through the above settings, the movement distance of the electrode plate in the oven can be adjusted as required, so as to adjust the dryness of the electrode plate and meet the requirements of the electrode plate for different drying states.

In some embodiments, the electrode plate drying device further includes a position tuning mechanism. The position tuning mechanism includes a connecting mechanism and a driving mechanism. The driving mechanism is connected to the first deflector roll and/or the second deflector roll by the connecting mechanism. The driving mechanism drives, through the connecting mechanism, the first deflector roll and/or the second deflector roll to move in the oven.

In the above solution, the driving mechanism and the connecting mechanism are disposed. The driving mechanism serves as a power source configured to drive the first deflector roll and/or the second deflector roll to move. The connecting mechanism serves as an intermediate structure to relay the movement of the first deflector roll and/or the second deflector roll, so that the positions of the first deflector roll and/or the second deflector roll in the oven are tunable.

In some embodiments, the electrode plate drying device further includes a guide rail. The first deflector roll and/or the second deflector roll is configured to move on the guide rail.

In the above solution, by virtue of the first deflector roll and/or the second deflector roll movable on the guide rail, the guide rail serving a function of supporting and guiding the first deflector roll and/or the second deflector roll, the first deflector roll and/or the second deflector roll can move along the direction of the guide rail, thereby making the first deflector roll and/or the second deflector roll movable in the oven.

In some embodiments, the connecting mechanism is movably connected to a roll shaft of the first deflector roll and/or the second deflector roll so as to drive, through the roll shaft, the first deflector roll and/or the second deflector roll to move on the guide rail.

In the above solution, the connecting mechanism is movably connected to the roll shaft of the first deflector roll and/or the second deflector roll. In this way, it is convenient for the connecting mechanism to drive the roll shaft to rotate. Further, the rotation of the roll shaft drives the first deflector roll and/or the second deflector roll to move on the guide rail.

In some embodiments, a bearing is disposed on the roll shaft. The connecting mechanism is connected to the roll shaft by the bearing, so as to drive, through the bearing, the first deflector roll and/or the second deflector roll to move on the guide rail.

In the above solution, a bearing is disposed on the roll shaft, so that the connecting mechanism can smoothly drive the roll shaft to rotate. Therefore, the rotation of the roll shaft drives the first deflector roll and/or the second deflector roll to move on the guide rail.

In some embodiments, the electrode plate drying device further includes: a measuring mechanism, disposed outside the oven, and configured to obtain data of the dried electrode plate; and a control mechanism, connected in communication to the measuring mechanism, and configured to control the driving mechanism based on the data obtained by the measuring mechanism, so as to adjust the positions of the first deflector roll and/or the second deflector roll in the oven.

In the above solution, the control mechanism determines dryness of the electrode plate based on the data obtained by the measuring mechanism, and then adjusts the movement distance of the electrode plate in the oven based on the drying state required by the electrode plate, thereby improving the drying effect of the electrode plate.

In some embodiments, the electrode plate drying device further includes an idler roll. The idler roll is disposed in the oven and is configured to support and convey the electrode plate in the oven.

In the above solution, the electrode plate is conveyed into the oven through the idler roll, and then conveyed to the first deflector roll and the second deflector roll. On the one hand, the disposed idler roll serves a function of supporting the electrode plate, and prevents the electrode plate from drooping and contacting the oven to damage the electrode plate. On the other hand, the idler roll enables the electrode plate to be conveyed along the desired path, guides the movement of the electrode plate, and implements controllability of the conveyance path of the electrode plate in the oven.

In some embodiments, a diameter of the idler roll is less than diameters of the first deflector roll and the second deflector roll.

In the above solution, the diameter of the idler roll is less than the diameters of the first deflector roll and the second deflector roll. A wrap angle of the electrode plate that winds around the first deflector roll and the second deflector roll is relatively small, and the first deflector roll and the second deflector roll support the electrode plate more stably, thereby reducing wrinkles of the electrode plate that winds around the first deflector roll and the second deflector roll.

In some embodiments, the electrode plate drying device includes a heating device configured to heat the first deflector roll and/or the second deflector roll.

In the above solution, the heating device is configured to heat the first deflector roll and/or the second deflector roll. In this way, the heated first deflector roll and/or second deflector roll can heat the electrode plate, thereby speeding up the drying of the electrode plate.

In some embodiments, the first deflector roll and/or the second deflector roll is of a structure of a hollow roll. Heat conduction oil or hot air is provided in the hollow roll to heat the hollow roll.

In the above solution, the first deflector roll and/or the second deflector roll is made to be a hollow roll. On the one hand, this arrangement reduces the material required for manufacturing the first deflector roll and/or the second deflector roll, reduces weight of the first deflector roll and/or the second deflector roll, and reduces cost. On the other hand, the heat conduction oil or hot air is provided in the hollow roll to heat the hollow roll, so that the hollow roll can dry the electrode plate after being heated, thereby speeding up the drying of the electrode plate.

In some embodiments, a drying source is disposed between the second deflector roll and an outlet of the oven, and is configured to dry the electrode plate.

In the above solution, the drying source can further dry the electrode plate between the second deflector roll and the outlet of the oven, thereby speeding up the drying of the electrode plate.

According to a second aspect, an embodiment of this application provides a coating device. The coating device is configured to coat a substrate with a slurry to form an electrode plate. The coating device includes the electrode plate drying device according to any one embodiment of the first aspect, and the electrode plate drying device is configured to dry the coated electrode plate.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

DETAILED DESCRIPTION OF EMBODIMENTS

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish between different items but not intended to indicate or imply relative importance or implicitly specify the number of the indicated technical features, specific order, or order of precedence. In the description of the embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "I" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of the embodiments of this application, unless otherwise expressly specified and defined, the technical terms such as "mounting", "concatenation", "connection", and "fixing" need to be understood in a broad sense, for example, understood as a fixed connection or a detachable connection or integrally formed; or understood as a mechanical connection or an electrical connection; understood as a direct connection, or an indirect connection implemented through an intermediary; or understood as internal communication between two components or interaction between two components. A person of ordinary skill in the art can understand the specific meanings of the terms in the embodiments of this application according to specific situations.

Currently, as can be seen from the market trend, the application of power batteries is increasingly extensive. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for power batteries keeps expanding with the widening of the fields to which the power batteries are applicable.

A power battery generally includes a housing and an electrode assembly. The housing is configured to accommodate the electrode assembly and an electrolytic solution. The electrode assembly generally includes a positive electrode plate and a negative electrode plate. Metal ions move between the positive electrode plate and the negative electrode plate to generate electrical energy. The positive electrode plate includes a positive current collector and a positive active material layer. A surface of the positive current collector is coated with the positive active material layer. Of the positive current collector, a part uncoated with the positive active material layer protrudes from a part coated with the positive active material layer. The part, uncoated with the positive active material layer, of the positive current collector, serves as a positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material layer. A surface of the negative current collector is coated with the negative active material layer. Of the negative current collector, a part uncoated with the negative active material layer protrudes from a part coated with the negative active material layer, and the part uncoated with the negative active material layer serves as a negative tab. The negative current collector may be made of copper, and a negative active material may be carbon, silicon, or the like. During production of an electrode plate, a positive/negative current collector is usually coated with a positive/negative active material slurry, and then the slurry is dried to prepare a positive/negative electrode plate.

The applicant finds that in the prior art, the drying state of the electrode plate that has been dried by an electrode plate drying device can hardly meet requirements. The dryness usually varies between different sections of the same electrode plate, or between different electrode plates. That is, the electrode plate is overdry or underdry. When the electrode plate is in an overdry state, on the one hand, the energy loss of the oven increases, and power consumption increases. On the other hand, the electrode plate is at risk of separator detachment, high brittleness, cracking, and the like. When the electrode plate is in an underdry state, the manufacturing process is prone to be disordered, for example, electrode plate sticking to the roll. In addition, when a high moisture content of a battery cell is caused by deficient dryness of the electrode plate, the performance and safety of the battery are impaired. Moreover, the performance of the battery cell or battery is also impaired by uneven dryness or insufficient consistency of the electrode plate or other factors.

Through research, the applicant finds that, on the one hand, the change in the external temperature and the change in a heat source of the drying device may lead to a change in the temperature inside the drying device, and therefore, lead to a change in the drying state of the electrode plate. On the other hand, the change in the moisture content in the air of an external environment also affects the drying state of the electrode plate.

To solve the problem that the drying state of the electrode plate is unable to meet requirements, the applicant has carried out in-depth research and found that the drying distance of the electrode plate in the oven may be made tunable, so as to meet the requirements of the electrode plate for different drying states. Based on the above considerations, an embodiment of this application provides an electrode plate drying device. A first deflector roll and a second deflector roll are disposed in an oven. Positions of the first deflector roll and/or the second deflector roll in the oven are tunable, so as to adjust a movement distance of the electrode plate in the oven. In this way, the drying distance of the electrode plate in the oven is tunable, thereby meeting the requirements of the electrode plate for different drying states.

The electrode plate drying device disclosed in an embodiment of this application is configured to dry the electrode plate. The electrode plate drying device is applicable, but without limitation, in a battery coater. The electrode plate includes a positive electrode plate and a negative electrode plate. The positive electrode plate and the negative electrode plate are configured to form an electrode assembly. The electrode assembly is an important part of a power battery. After the positive electrode plate and the negative electrode plate are coated in a battery coating device, the drying state of the electrode plate is crucial to the production of the battery.

Figure 1:
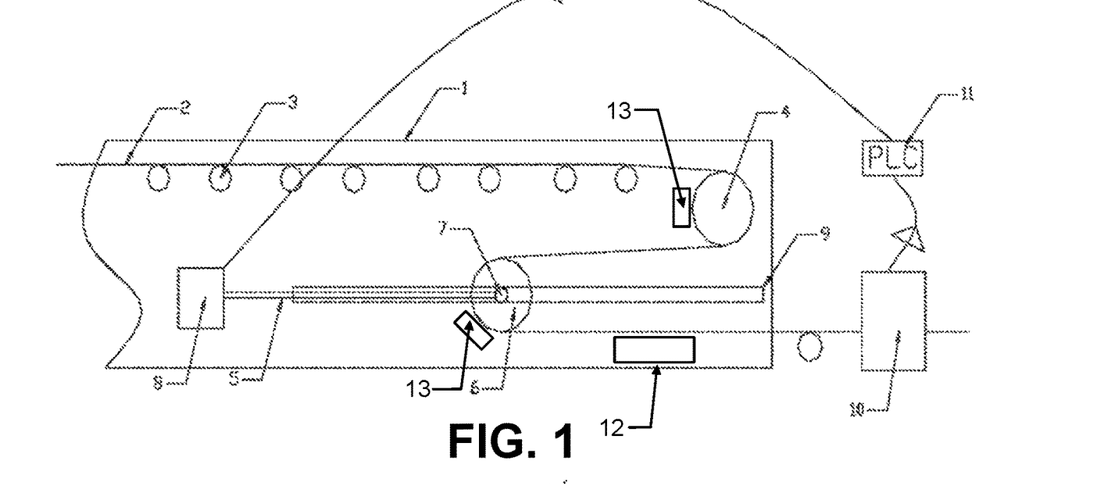
FIG. 1 is a schematic structural diagram of an electrode plate drying device according to some embodiments of this application.

FIG. 1 is a schematic structural diagram of an electrode plate drying device according to some embodiments of this application. As shown in FIG. 1, the electrode plate drying device includes an oven 1, a first deflector roll 4, and a second deflector roll 6. The oven 1 is configured to dry an electrode plate 2. The first deflector roll 4 and the second deflector roll 6 are disposed in the oven 1. The electrode plate 2 winds around the first deflector roll 4 and the second deflector roll 6. Positions of the first deflector roll 4 and/or the second deflector roll 6 in the oven 1 are tunable so as to adjust a movement distance of the electrode plate 2 in the oven 1.

In some embodiments, the position of the first deflector roll 4 alone in the oven 1 is tunable, and the position of the second deflector roll 6 in the oven 1 is not tunable. That is, the position of the first deflector roll 4 in the oven 1 is made tunable, so as to adjust the movement distance of the electrode plate 2 in the oven 1.

In some embodiments, the position of the second deflector roll 6 alone in the oven 1 is tunable, and the position of the first deflector roll 4 in the oven 1 is not tunable. That is, the position of the second deflector roll 6 in the oven 1 is made tunable, so as to adjust the movement distance of the electrode plate 2 in the oven 1.

In some embodiments, the positions of both the first deflector roll 4 and the second deflector roll 6 in the oven 1 are tunable. That is, the positions of the first deflector roll 4 and the second deflector roll 6 in the oven 1 are made tunable, so as to adjust the movement distance of the electrode plate 2 in the oven 1.

Referring to FIG. 1, the following describes an example in which the position of the second deflector roll 6 in the oven 1 is tunable. The oven 1 is configured to dry the electrode plate 2 placed in the oven 1. The first deflector roll 4 and the second deflector roll 6 are configured to change the motion direction of the electrode plate 2 in the oven 1. The position of the second deflector roll 6 in the oven 1 is tunable, so as to adjust the movement distance of the electrode plate 2 in the oven 1.

Specifically, as shown in FIG. 1, the electrode plate 2 moves in the oven 1 through the idler roll 3, and is conveyed to the first deflector roll 4 and deflected at the first deflector roll 4. When moving to the second deflector roll 6, the electrode plate is deflected again at the second deflector roll 6. When the second deflector roll 6 moves away from the first deflector roll 4, the movement distance of the electrode plate 2 in the oven 1 increases. When the second deflector roll 6 moves toward the first deflector roll 4, the movement distance of the electrode plate 2 in the oven 1 decreases. Put simply, when the electrode plate 2 is in an underdry state, that is, when the dryness of the electrode plate 2 fails to reach the preset dryness, the second deflector roll 6 is caused to move away from the first deflector roll 4. When the electrode plate 2 is in an overdry state, that is, when the dryness of the electrode plate 2 exceeds the preset dryness, the second deflector roll 6 is caused to move toward the first deflector roll 4. Optionally, the length of the oven 1, that is, the length of the main structure of the oven 1, is 3 to 200 m.

Optionally, the first deflector roll 4 and the second deflector roll 6 are made of metal or alloy of high thermal conductivity, for example, steel, tungsten steel, chrome-plated steel, or the like. It is hereby noted that the first deflector roll 4 and the second deflector roll 6 may be made of other materials instead, and the materials are not limited herein.

Optionally, the first deflector roll 4 is movable in the oven 1 for a distance of 0 to 100 m.

Optionally, the second deflector roll 6 is movable in the oven 1 for a distance of 0 to 100 m.

An electrode plate drying device is disposed. The electrode plate drying device includes an oven 1, a first deflector roll 4, and a second deflector roll 6. The positions of the first deflector roll 4 and/or the second deflector roll 6 in the oven 1 are tunable. In this way, the dryness of the electrode plate 2 can be adjusted as actually required, thereby solving the overdry or underdry problem of the electrode plate 2, making the drying distance of the electrode plate 2 tunable in the oven 1, and meeting the requirements of the electrode plate 2 for different drying states. In addition, when the first deflector roll 4 and/or the second deflector roll 6 is adjusted to increase the distance between the two deflector rolls, the drying distance of the electrode plate 2 in the oven 1 increases. In this way, the dryness requirement of the electrode plate 2 is met without increasing the length of the oven 1, thereby reducing the length of the oven 1, and in turn, reducing the floor space of the oven 1.

In some embodiments, at least one first deflector roll 4 and at least one second deflector roll 6 are disposed in the oven 1. For example, two first deflector rolls 4 and one second deflector roll 6 are disposed in the oven 1. Along the length direction of the oven 1, the first deflector roll 4, the second deflector roll 6, and the first deflector roll 4 are arranged in sequence. By adjusting the relative position between the two first deflector rolls 4 and the second deflector roll 6, the drying distance of the electrode plate 2 in the oven 1 is further increased, thereby reducing the length of the oven 1, and in turn, reducing the floor space of the oven 1. In other embodiments, two first deflector rolls 4 and two second deflector rolls 6, or one first deflector roll 4 and two second deflector rolls 6, may be disposed in the oven 1. The specific number of the first deflector rolls 4 and the second deflector rolls 6 is not limited herein.

In some embodiments, the electrode plate drying device further includes a position tuning mechanism. The position tuning mechanism is configured to adjust the position of the first deflector roll 4 and/or the second deflector roll 6 in the oven 1. The position tuning mechanism includes a connecting mechanism 5 and a driving mechanism 8. The driving mechanism 8 is connected to the first deflector roll 4 and/or the second deflector roll 6 by the connecting mechanism 5. The driving mechanism 8 drives, through the connecting mechanism 5, the first deflector roll 4 and/or the second deflector roll 6 to move in the oven 1.

Referring to FIG. 1, the following describes an example in which the position of the second deflector roll 6 is adjusted by the position tuning mechanism. One end of the connecting mechanism 5 is connected to a roll shaft 7 of the second deflector roll 6, and the other end of the connecting mechanism is connected to the driving mechanism 8. When the electrode plate 2 is in an underdry state, that is, when the dryness of the electrode plate 2 fails to reach the preset dryness, the driving mechanism 8 drives, through the connecting mechanism 5, the second deflector roll 6 to move away from the first deflector roll 4 to increase the movement distance of the electrode plate 2 in the oven 1. When the electrode plate 2 is in an overdry state, that is, when the dryness of the electrode plate 2 exceeds the preset dryness, the driving mechanism 8 drives, through the connecting mechanism 5, the second deflector roll 6 to move toward the first deflector roll 4 to decrease the movement distance of the electrode plate 2 in the oven 1.

By virtue of the connecting mechanism 5 and the driving mechanism 8, the driving mechanism 8 serves as a power source configured to drive the first deflector roll 4 and/or the second deflector roll 6. The connecting mechanism 5 serves as an intermediate structure to relay the movement of the first deflector roll 4 and/or the second deflector roll 6, so that the positions of the first deflector roll 4 and/or the second deflector roll 6 in the oven 1 are tunable.

In some embodiments, the electrode plate drying device further includes a guide rail 9. The first deflector roll 4 and/or the second deflector roll 6 is configured to move on the guide rail 9.

Referring to FIG. 1, the following describes an example in which the second deflector roll 6 moves on the guide rail 9. When the electrode plate 2 is in an underdry state, the driving mechanism 8 drives, through the connecting mechanism 5, the second deflector roll 6 to move on the guide rail 9 away from the first deflector roll 4 to increase the movement distance of the electrode plate 2 in the oven 1. When the electrode plate 2 is in an overdry state, the driving mechanism 8 drives, through the connecting mechanism 5, the second deflector roll 6 to move on the guide rail 9 toward the first deflector roll 4 to decrease the movement distance of the electrode plate 2 in the oven 1.

Figure 2:
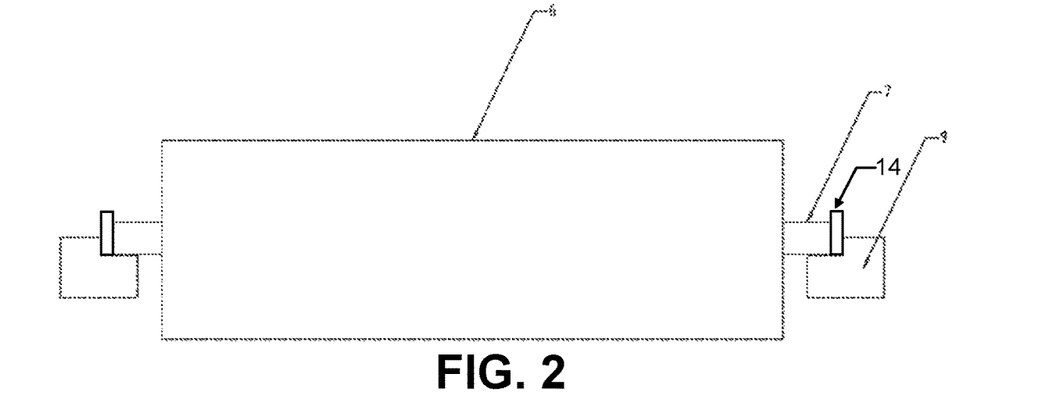
FIG. 2 is a schematic connection diagram of a guide rail and a second deflector roll according to some embodiments of this application.

FIG. 2 is a schematic connection diagram of a guide rail and a second deflector roll according to some embodiments of this application. Referring to FIG. 2, both sides of the roll shaft 7 of the second deflector roll 6 are disposed on the guide rail 9 and the guide rail 9 is not in contact with a roll surface of the second deflector roll 6. The driving mechanism 8 can drive the second deflector roll 6 to move on the guide rail 9. The guide rail 9 serves a function of supporting and guiding the second deflector roll 6.

Optionally, in some embodiments, the guide rail 9 is disposed parallel to the length direction of the oven 1, so that the second deflector roll 6 can move along a direction parallel to the length direction of the oven 1. It is hereby noted that the guide rail in the oven may be disposed obliquely or vertically instead, as long as the movement distance of the electrode plate 2 in the oven 1 is tunable.

In some embodiments, a first bearing 14 is disposed on the roll shaft of the first deflector roll and/or the second deflector roll. The roll shaft of the first deflector roll 4 and/or the second deflector roll 6 moves on the guide rail 9 through the first bearing.

By virtue of the guide rail 9 disposed in the oven 1, the guide rail 9 serving a function of supporting and guiding the first deflector roll 4 and/or the second deflector roll 6, the first deflector roll 4 and/or the second deflector roll 6 can move on the guide rail 9 along the direction of the guide rail 9, thereby making the first deflector roll 4 and/or the second deflector roll 6 movable in the oven 1.

In some embodiments, the connecting mechanism 5 is movably connected to a roll shaft of the first deflector roll 4 and/or the second deflector roll 6 so as to drive, through the roll shaft, the first deflector roll 4 and/or the second deflector roll 6 to move on the guide rail.

Figure 3:
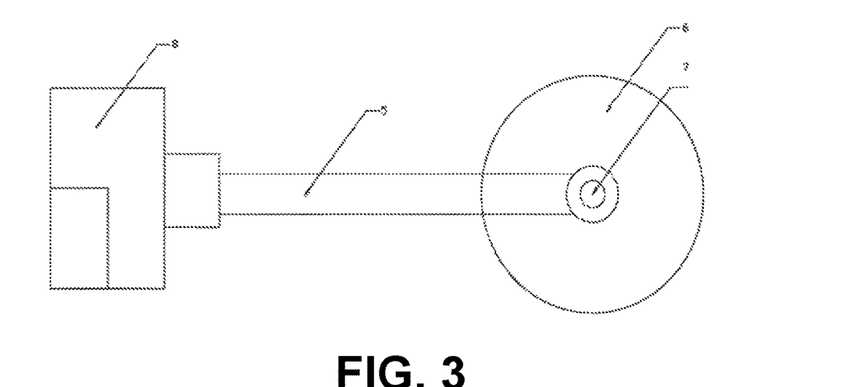
FIG. 3 is a schematic connection diagram of a connecting mechanism, a driving mechanism, and a second deflector roll according to some embodiments of this application.

FIG. 3 is a schematic connection diagram of a connecting mechanism 5, a driving mechanism 8, and a second deflector roll 6 according to some embodiments of this application. As shown in FIG. 3, one end of the connecting mechanism 5 is connected to the second deflector roll 6 by the roll shaft 7, and the other end of the connecting mechanism is connected to the driving mechanism 8. The driving mechanism 8 drives the connecting mechanism 5 to move in the oven 1, and then the connecting mechanism 5 drives, through the roll shaft 7, the second deflector roll 6 to move on the guide rail 9.

Referring to FIG. 1 and FIG. 3, the following describes an example in which the connecting mechanism 5 is movably connected to the roll shaft 7 of the second deflector roll 6. When the electrode plate 2 is in an underdry state, as driven by the driving mechanism 8, the connecting mechanism 5 drives, through the roll shaft 7, the second deflector roll 6 to move on the guide rail 9 away from the first deflector roll 4 to increase the movement distance of the electrode plate 2 in the oven 1. When the electrode plate 2 is in an overdry state, as driven by the driving mechanism 8, the connecting mechanism 5 drives, through the roll shaft 7, the second deflector roll 6 to move on the guide rail 9 toward the first deflector roll 4 to decrease the movement distance of the electrode plate 2 in the oven 1.

Optionally, by means of motor, pneumatic pressure, hydraulic pressure, or the like, which is not limited herein, the driving mechanism 8 can drive the connecting mechanism 5 to move.

Optionally, the driving mechanism 8 is integrated into the second deflector roll 6. As an example, a driving mechanism 8 is disposed in the second deflector roll 6. For example, a motor is built in the second deflector roll 6. With the driving mechanism 8 integrated with the second deflector roll 6, the connecting mechanism 5 is omitted, and the occupied area in the oven 1 is reduced.

Optionally, the driving mechanism 8 drives the second deflector roll 6 to be movable within a range of 0 to 100 m in the oven 1.

The connecting mechanism 5 is movably connected to the roll shaft of the first deflector roll 4 and/or the second deflector roll 6. In this way, it is convenient for the connecting mechanism 5 to drive the roll shaft to rotate. Further, the rotation of the roll shaft drives the first deflector roll 4 and/or the second deflector roll 6 to move on the guide rail 9.

In some embodiments, a second bearing (not shown in the drawing) is disposed on the roll shaft. The connecting mechanism 5 is connected to the roll shaft by the second bearing, so as to drive, through the second bearing, the first deflector roll 4 and/or the second deflector roll 6 to move on the guide rail 9.

Referring to FIG. 1, the following describes an example in which a second bearing is disposed on the roll shaft 7 of the second deflector roll 6. When the electrode plate 2 is in an underdry state, as driven by the driving mechanism 8, the connecting mechanism 5 drives, through the second bearing, the roll shaft 7 to rotate. Further, the roll shaft 7 drives the second deflector roll 6 to move on the guide rail 9 away from the first deflector roll 4 to increase the movement distance of the electrode plate 2 in the oven 1. When the electrode plate 2 is in an overdry state, as driven by the driving mechanism 8, the connecting mechanism 5 drives, through the second bearing, the roll shaft 7 to rotate. Further, the roll shaft 7 drives the second deflector roll 6 to move on the guide rail 9 toward the first deflector roll 4 to decrease the movement distance of the electrode plate 2 in the oven 1.

With the second bearing disposed on the roll shaft, the connecting mechanism 5 can smoothly drive the first deflector roll 4 and/or the second deflector roll 6 to move on the guide rail 9. In some embodiments, the electrode plate drying device further includes a measuring mechanism 10 and a control mechanism 11. The measuring mechanism 10 is disposed outside the oven 1. The measuring mechanism 10 and the control mechanism 11 are connected in communication. The measuring mechanism 10 is configured to obtain data of the dried electrode plate 2, and feed the data back to the control mechanism 11. The control mechanism 11 controls the driving mechanism 8 based on the data, so as to adjust the positions of the first deflector roll 4 and/or the second deflector roll 6 in the oven 1.

Specifically, the following describes an example in which the control mechanism 11 adjusts the position of the second deflector roll 6 in the oven 1. The measuring mechanism 10 and the control mechanism 11 are disposed outside the oven 1. After the electrode plate 2 is moved out of the oven 1, the measuring mechanism 10 measures the electrode plate 2 to obtain the data of the dried electrode plate 2, and then feeds back the data to the control mechanism 11. The control mechanism 11 analyzes the drying state of the electrode plate 2 based on the data fed back. When the electrode plate 2 is in an underdry state, that is, when the dryness of the electrode plate 2 fails to reach the preset dryness, the control mechanism 11 controls the driving mechanism 8 to drive the second deflector roll 6 to move away from the first deflector roll 4. When the electrode plate 2 is in an overdry state, that is, when the dryness of the electrode plate 2 exceeds the preset dryness, the control mechanism 11 controls the driving mechanism 8 to drive the second deflector roll 6 to move toward the first deflector roll 4.

Optionally, the control mechanism 11 may control the driving mechanism 8 in real time based on the data fed back, so as to adjust the positions of the first deflector roll 4 and/or the second deflector roll 6 in the oven 1.

The measuring mechanism 10 and the control mechanism 11 can obtain the drying state of the electrode plate 2, determine the control on the driving mechanism 8 based on the drying state of the electrode plate 2, so as to adjust the positions of the second deflector roll 6 and/or the first deflector roll 4 in the oven 1. In this way, the movement distance of the electrode plate 2 in the oven 1 is tunable, thereby improving the drying effect of the electrode plate.

In some embodiments, the data of the dried electrode plate 2 measured by the measuring mechanism 10 includes a weight loss rate of the electrode plate 2. When the weight loss rate exceeds a reference range, the control mechanism 11 is configured to control the driving mechanism 8 to drive the first deflector roll 4 and/or the second deflector roll 6 to move, so as to change the movement distance of the electrode plate 2 in the oven 1.

Optionally, the reference range includes an upper limit and a lower limit. When the weight loss rate is less than the lower limit, the control mechanism 11 controls the driving mechanism 8 to drive the first deflector roll 4 and/or the second deflector roll 6 to move, so as to decrease the movement distance of the electrode plate 2 in the oven 1. When the weight loss rate is greater than the upper limit, the control mechanism 11 controls the driving mechanism 8 to drive the first deflector roll 4 and/or the second deflector roll 6 to move, so as to increase the movement distance of the electrode plate 2 in the oven 1.

Optionally, the weight loss rate of the electrode plate 2 may be measured by the following method. After the electrode plate 2 is removed from the oven 1, a specimen is taken off the electrode plate 2. The measuring mechanism 10 measures the weight W1 per unit area of the specimen. After the specimen taken out has been dried or heated for a period of time, the weight W2 per unit area of the specimen is measured. The weight loss rate Q of the electrode plate 2 is calculated according to $$Q = \frac{W1 - W2}{W1}.$$

Optionally, when the weight loss rate Q is less than the lower limit, it indicates that the electrode plate 2 is in an overdry state, that is, the drying distance of the electrode plate 2 in the oven 1 is unduly long. In this case, the control mechanism 11 controls the driving mechanism 8 to drive the second deflector roll 6 to move toward the first deflector roll 4, so as to decrease the drying distance of the electrode plate 2 in the oven 1. When the weight loss rate Q is greater than the upper limit, it indicates that the electrode plate 2 is in an underdry state, that is, the drying distance of the electrode plate 2 in the oven 1 is unduly short. In this case, the control mechanism 11 controls the driving mechanism 8 to drive the second deflector roll 6 to move away from the first deflector roll 4, so as to increase the drying distance of the electrode plate 2 in the oven 1.

Figure 4:
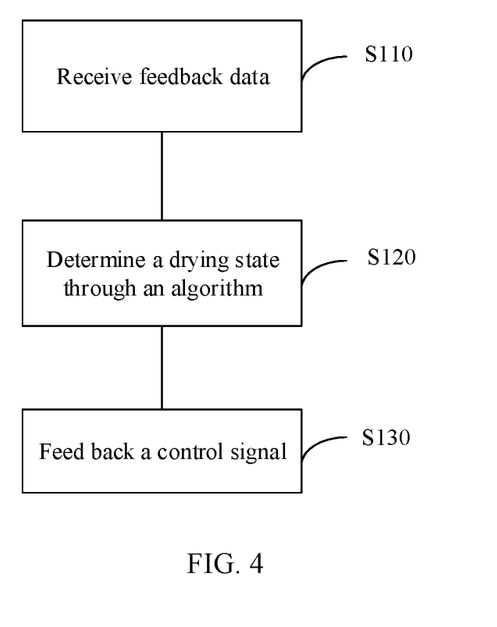
FIG. 4 is a working flowchart of a control mechanism according to some embodiments of this application.

FIG. 4 is a working flowchart of a control mechanism according to some embodiments of this application. Optionally, referring to FIG. 4, the working process of the control mechanism 11 is described below.

S110: A control mechanism 11 receives feedback data. Specifically, the measuring mechanism 10 collects electrode plate data while being live, and feeds the data back to the control mechanism 11. Optionally, the measuring mechanism 10 may be a weight measuring mechanism, and the data fed back may be a weight loss rate of the electrode plate.

S120: The control mechanism 11 determines a drying state through an algorithm. Specifically, the control mechanism 11 determines the drying state of the electrode plate 2 by means of an algorithm, logic judgment, and other functions based on the feedback data, that is, determines whether the electrode plate 2 is overdry or underdry.

S130: The control mechanism 11 feeds back a control signal. Specifically, based on a determining result, the control mechanism 11 sends a control signal to the driving mechanism 8 to adjust the position of the first deflector roll 4 and/or the second deflector roll 6 in the oven 1, so as to optimize the drying distance of the electrode plate 2.

Optionally, when determining that the weight loss rate of the electrode plate is less than a lower limit, that is, determining that the electrode plate 2 is in an overdry state, the control mechanism 11 sends a first control signal to the driving mechanism 8. The driving mechanism 8 drives the second deflector roll 6 to move toward the first deflector roll 4. In this case, the drying distance of the electrode plate 2 in the oven 1 is decreased, thereby solving the overdry problem of the electrode plate 2. When determining that the weight loss rate of the electrode plate is greater than an upper limit, that is, determining that the electrode plate 2 is in an underdry state, the control mechanism 11 sends a second control signal to the driving mechanism 8. The driving mechanism 8 drives the second deflector roll 6 to move away from the first deflector roll 4. In this case, the drying distance of the electrode plate 2 in the oven 1 is increased, thereby solving the underdry problem of the electrode plate 2.

It is hereby noted that the reference range, upper limit, and lower limit mentioned in this embodiment may be set according to actual needs, and the value of the reference range is not limited herein.

The control mechanism 11 controls the driving mechanism 8 based on the weight loss rate measured by the measuring mechanism 10, so as to adjust the positions of the first deflector roll 4 and/or the second deflector roll 6 in the oven 1, and in turn, optimize the drying distance of the electrode plate 2, and improve the drying effect of electrode plate 2.

In some embodiments, the electrode plate drying device further includes an idler roll 3. The idler roll 3 is disposed in the oven 1 and is configured to support and convey the electrode plate 2 in the oven 1. Optionally, after entering the oven 1, the electrode plate 2 moves to the first deflector roll 4 and the second deflector roll 6 as supported and conveyed by the idler roll 3.

On the one hand, the disposed idler roll 3 serves a function of supporting the electrode plate 2 and prevents the electrode plate 2 from drooping and contacting the oven to damage the electrode plate. On the other hand, the idler roll enables the electrode plate 2 to be conveyed along the desired path, guides the movement of the electrode plate 2, and implements controllability of the conveyance path of the electrode plate 2 in the oven 1.

In some embodiments, a diameter of the idler roll 3 is less than diameters of the first deflector roll 4 and the second deflector roll 6.

Generally, the smaller the roll diameter of the roll, the larger the wrap angle of the electrode plate 2 that winds around the roll, and the easier it is to wrinkle the electrode plate. In addition, when the roll diameter increases, the contact area between the roll and the electrode plate increases, thereby supporting the electrode plate more stably and reducing the risk of wrinkling. By setting the diameter of the first deflector roll 4 and the second deflector roll 6 to be greater than the diameter of the idler roll 3, that is, the first deflector roll 4 and the second deflector roll 6 are rolls with a relatively large diameter, this embodiment can reduce the wrap angle of the electrode plate 2 that winds around the first deflector roll 4 and the second deflector roll 6, thereby reducing the risk of wrinkling the electrode plate 2.

In some embodiments, the electrode plate drying device includes a heating device 13 configured to heat the first deflector roll 4 and/or the second deflector roll 6.

With the first deflector roll 4 and/or the second deflector roll 6 being heated, the electrode plate 2 can be heated when contacting the first deflector roll 4 and/or the second deflector roll 6. In this way, evaporation of the residual solvent on the electrode plate 2 is accelerated without increasing the length of the oven 1, and the drying of the electrode plate 2 is accelerated.

In some embodiments, the first deflector roll 4 and/or the second deflector roll 6 is of a structure of a hollow roll. Heat conduction oil or hot air is provided in the hollow roll to heat the hollow roll.

The first deflector roll 4 and/or the second deflector roll 6 is made to be a hollow roll structure. On the one hand, this arrangement reduces the material required for manufacturing the first deflector roll 4 and/or the second deflector roll 6, reduces weight of the first deflector roll 4 and/or the second deflector roll 6, and reduces cost. On the other hand, the heat conduction oil or hot air is provided in the hollow roll to heat the hollow roll, so that the hollow roll can dry the electrode plate 2 after being heated, thereby accelerating evaporation of the residual solvent on the electrode plate 2 and speeding up the drying of the electrode plate 2.

Optionally, the hollow roll may be heated by a magnetic induction device disposed inside the hollow roll. By the advantages such as fast response and fast temperature rise, the magnetic induction heating can further increase the drying speed of the electrode plate 2.

Optionally, the first deflector roll 4 and/or the second deflector roll 6 may be solid rolls. With the first deflector roll 4 and/or the second deflector roll 6 being solid rolls that are larger than the idler roll 3 in diameter, it is convenient to deflect the electrode plate 2 in the oven 1, thereby reducing the risk of wrinkling the electrode plate 2. In addition, compared with the hollow rolls, the solid rolls preserve heat more effectively, and facilitate heating of the electrode plate 2, thereby increasing the drying speed of the electrode plate 2.

In some embodiments, the electrode plate 2 is set to move toward an outlet of the oven 1 after being deflected by the second deflector roll 6. A drying source 12 is disposed between the second deflector roll 6 and the outlet of the oven 1, and is configured to dry the electrode plate.

Optionally, the drying source may be hot air, infrared heating, waste heat, or the like, configured to dry the electrode plate 2. Optionally, the drying source may be located above or below the electrode plate 2. This embodiment of this application does not specifically limit whether the drying source is located above or below the electrode plate 2, as long as the drying source can further dry the electrode plate 2.

With the drying source disposed between the second deflector roll 6 and the outlet of the oven 1, the drying source can further dry the electrode plate 2 between the second deflector roll 6 and the outlet of the oven 1, thereby speeding up the drying of the electrode plate 2.

In this application, an electrode plate drying device is disposed. The electrode plate drying device includes an oven 1, a first deflector roll 4, and a second deflector roll 6. The positions of the first deflector roll 4 and/or the second deflector roll 6 in the oven 1 are tunable, so as to adjust the drying distance of the electrode plate 2 in the oven 1. Through the above arrangement, the dryness of the electrode plate 2 can be adjusted as actually required, thereby solving the overdry or underdry problem of the electrode plate 2, making the drying distance of the electrode plate 2 tunable in the oven 1, and meeting the requirements of the electrode plate 2 for different drying states, and moreover, reducing the length of the oven 1 and reducing the floor space of the oven 1. According to some embodiments of this application, referring to FIG. 1 to FIG. 4, this application provides an electrode plate drying device. The electrode plate drying device includes an oven 1, and a first deflector roll 4 and a second deflector roll 6 that are disposed in the oven 1, a connecting mechanism 5 that connects the second deflector roll 6 and a driving mechanism 8, and a measuring mechanism 10 and a control mechanism 11 that are disposed outside the oven 1. The electrode plate 2 moves to the first deflector roll 4 as supported by the idler roll 3, and is deflected by the first deflector roll 4, and then moves away from the first deflector roll 4. Afterward, the electrode plate 2 moves to the second deflector roll 7, and is deflected again by the second deflector roll 7, and then moves toward the first deflector roll 4 until moving out of the oven 1. After obtaining the weight loss rate of the electrode plate 2, the measuring mechanism 10 feeds back the weight loss rate to the control mechanism 11. The control mechanism 11 determines the weight loss rate. When the weight loss rate is less than a lower limit in a reference range, it indicates that the electrode plate 2 is in an overdry state. In this case, the control mechanism 11 controls the operation of the driving mechanism 8, so that the connecting mechanism 5 drives the second deflector roll 6 to move on the guide rail 9 away from the inside of the oven 1, thereby decreasing the movement distance of the electrode plate 2 in the oven 1, and reducing the dryness of the electrode plate 2. When the control mechanism 11 determines that the weight loss rate is greater than an upper limit in the reference range, it indicates that the electrode plate 2 is in an underdry state. That is, the electrode plate 2 is not dry enough. In this case, the control mechanism 11 controls the driving mechanism 8 to run, so that the connecting mechanism 5 drives the second deflector roll 6 to move on the guide rail 9 toward the inside of the oven 1, thereby increasing the movement distance of the electrode plate 2 in the oven 1, and increasing the dryness of the electrode plate 2.

This application further provides a coating device. The coating device is configured to coat a substrate with a slurry to form an electrode plate. The coating device includes any one of the electrode plate drying devices described above. The electrode plate drying device is configured to dry the coated electrode plate.

To the extent that no conflict occurs, different embodiments of this application and the features in the embodiments may be combined with each other.

The foregoing embodiments are just intended to describe the technical solutions of this application, but not to limit this application. To a person skilled in the art, various modifications and variations may be made to this application. Any modifications, equivalent replacements, improvements, and the like made without departing from the spirit and principles of this application still fall within the protection scope of this application.

What is claimed is:

1. An electrode plate drying device, comprising:
an oven, configured to dry an electrode plate moving through the oven along a moving path from an inlet to an outlet of the oven;
a first deflector roll and a second deflector roll, disposed in the oven along the moving path between the inlet and the outlet, wherein the electrode plate is in contact with the first deflector roll and the second deflector roll and is controlled to move in a direction from the first deflector roll to the second deflector roll;
a driver connected to at least one of the first deflector roll and the second deflector roll through a connector, the driver configured to drive the at least one of the first deflector roll and the second deflector roll to move in the oven to a new position different from a current position; and
a controller configured to:
receive real-time dryness data indicating a weight loss rate of the electrode plate according to a formula: weight loss rate=(W1−W2)/W1, wherein
W1 indicates a weight per unit area of a specimen taken off from the electrode plate after the electrode plate is immediately removed from the oven; and
W2 indicates a weight per unit area of the specimen after the specimen is dried or heated for a period of time outside of the oven;
compare the real-time dryness data with a predetermined reference range to determine a drying state of the electrode plate, wherein the reference range includes an upper limit and a lower limit, the drying state is an overdry state if the weight loss rate is less than the lower limit, the drying state of the electrode plate is an underdry state if the weight loss rate is more than the upper limit;
cause the driver to drive the at least one of the first deflector roll and the second deflector roll to move in the oven to a new position; and
adjust a total drying distance of the moving path of the electrode plate in the oven, based on the drying state of the electrode plate.

2. The electrode plate drying device according to claim 1, wherein the electrode plate drying device further comprises a guide rail, and the driver is configured to cause the at least one of the first deflector roll and the second deflector roll to move on the guide rail.

3. The electrode plate drying device according to claim 2, wherein the connector is movably connected to the at least one of the first deflector roll and the second deflector roll through a roll shaft, and the driver is configured to drive, through the roll shaft, the at least one of the first deflector roll and the second deflector roll to move on the guide rail.

4. The electrode plate drying device according to claim 3, wherein a bearing is disposed on and connected to the roll shaft, and the connector is connected to the bearing, and the driver is configured to drive, through the bearing, the at least one of the first deflector roll and the second deflector roll to move on the guide rail.

5. The electrode plate drying device according to claim 1, wherein the electrode plate drying device further comprises: an idler roll, the idler roll is disposed in the oven along the moving path and is configured to support the electrode plate moving in the oven.

6. The electrode plate drying device according to claim 5, wherein a diameter of the idler roll is less than diameters of the first deflector roll and the second deflector roll.

7. The electrode plate drying device according to claim 1, wherein the electrode plate drying device comprises a heating device configured to heat at least one of the first deflector roll and the second deflector roll.

8. The electrode plate drying device according to claim 7, wherein at least one of the first deflector roll and the second deflector roll is a hollow roll, and heat conduction oil or hot air is provided in the hollow roll to heat the hollow roll.

9. The electrode plate drying device according to claim 1, further comprising a drying source disposed between the second deflector roll and the outlet of the oven along the moving path, and the drying source is configured to dry the electrode plate.

10. The electrode plate drying device according to claim 1, wherein the driver is connected to the second deflector roll and configured to drive the second deflector roll to:
move toward the first deflector roll to decrease the total drying distance of the moving path of the electrode plate in the oven; and
move away from the first deflector roll to increase the total drying distance of the moving path of the electrode plate in the oven.

11. The electrode plate drying device according to claim 1, wherein the driver is connected to both the first deflector roll and the second deflector roll and configured to drive both the first deflector roll and the second deflector roll to:
move toward each other to decrease the total drying distance of the moving path of the electrode plate in the oven; and
move away from each other to increase the total drying distance of the moving path of the electrode plate in the oven.

12. The electrode plate drying device according to claim 1, wherein the controller is configured to:
in response to a determination that the drying state of the electrode plate is an overdry state, increase the total drying distance of the moving path of the electrode plate; and
in response to a determination that the drying state of the electrode plate is an underdry state, decrease the total drying distance of the moving path of the electrode plate.

13. A coating device, configured to coat a substrate with a slurry to form an electrode plate, comprises an electrode plate drying device, wherein the electrode plate drying device is configured to dry the coated electrode plate, and the electrode plate drying device comprises:
an oven, configured to dry an electrode plate moving through the oven along a moving path from an inlet to an outlet of the oven;
a first deflector roll and a second deflector roll, disposed in the oven along the moving path between the inlet and the outlet, wherein the electrode plate is in contact with the first deflector roll and the second deflector roll and is controlled to move in a direction from the first deflector roll to the second deflector roll;

a driver connected to at least one of the first deflector roll and the second deflector roll through a connector, the driver configured to drive the at least one of the first deflector roll and the second deflector roll to move in the oven to a new position different from a current position; and a controller configured to:
receive real-time dryness data indicating a weight loss rate of the electrode plate according to a formula: weight loss rate=(W1−W2)/W1, wherein
W1 indicates a weight per unit area of a specimen taken off from the electrode plate after the electrode plate is immediately removed from the oven; and
W2 indicates a weight per unit area of the specimen after the specimen is dried or heated for a period of time outside of the oven;
compare the real-time dryness data with a predetermined reference range to determine a drying state of the electrode plate, wherein the reference range includes an upper limit and a lower limit, the drying state is an overdry state if the weight loss rate is less than the lower limit, the drying state of the electrode plate is an underdry state if the weight loss rate is more than the upper limit;
cause the driver to drive the at least one of the first deflector roll and the second deflector roll to move in the oven to a new position; and
adjust a total drying distance of the moving path of the electrode plate in the oven, based on the drying state of the electrode plate.

14. The coating device according to claim 13, wherein the electrode plate drying device further comprises a guide rail, and the driver is configured to cause the at least one of the first deflector roll and the second deflector roll to move on the guide rail.

15. The coating device according to claim 14, wherein the connector is movably connected to the at least one of the first deflector roll and the second deflector roll through a roll shaft, and the driver is configured to drive, through the roll shaft, the at least one of the first deflector roll and the second deflector roll to move on the guide rail.

16. The coating device according to claim 15, wherein a bearing is disposed on and connected to the roll shaft, and the connector is connected to the bearing, and the driver is configured to drive, through the bearing, the at least one of the first deflector roll and the second deflector roll to move on the guide rail.

17. The coating device according to claim 13, wherein the electrode plate drying device comprises a heating device configured to heat at least one of the first deflector roll and the second deflector roll.

18. The coating device according to claim 13, further comprising a drying source disposed between the second deflector roll and the outlet of the oven along the moving path, and the drying source is configured to dry the electrode plate.

19. The coating device according to claim 13, wherein the driver is connected to both the first deflector roll and the second deflector roll and configured to drive both the first deflector roll and the second deflector roll to:
move toward each other to decrease the total drying distance of the moving path of the electrode plate in the oven; and
move away from each other to increase the total drying distance of the moving path of the electrode plate in the oven.

20. The coating device according to claim 13, wherein the controller is configured to:
in response to a determination that the drying state of the electrode plate is an overdry state, increase the total drying distance of the moving path of the electrode plate; and
in response to a determination that the drying state of the electrode plate is an underdry state, decrease the total drying distance of the moving path of the electrode plate.

* * * * *